United States Patent [19]
Kusuda et al.

[11] 3,930,556
[45] Jan. 6, 1976

[54] METHOD OF DETECTING LEAK OF FLUID FROM A LONG PIPELINE

[75] Inventors: Takazo Kusuda, Ibaraki; Niichi Nishiwaki, Tokyo, both of Japan

[73] Assignee: Osaka Gas Kabushiki Kaisha, Osaka, Japan

[22] Filed: June 5, 1973

[21] Appl. No.: 367,337

Related U.S. Application Data

[62] Division of Ser. No. 247,474, April 25, 1972, Pat. No. 3,814,207.

[30] Foreign Application Priority Data

Apr. 26, 1971  Japan.............................. 46-27810
Dec. 8, 1971  Japan.............................. 46-99737

[52] U.S. Cl................ 181/.5; 340/242; 73/40.5; 73/194 A; 73/194 B
[51] Int. Cl.²............................................ G01V 1/00
[58] Field of Search........ 181/.5 R; 340/242; 73/40, 73/69, 71.4, 40.5 A, 40.5 R, 194 A, 194 B

[56] References Cited
UNITED STATES PATENTS 2,940,302  6/1960  Scherbatskoy.................. 73/40.5 A
3,028,450  4/1962  Manning.............................. 340/242

FOREIGN PATENTS OR APPLICATIONS
794,127  9/1968  Canada.............................. 340/242

OTHER PUBLICATIONS

Long, "Sonic Leak Detection," 8/60, pp. 18,20–22 and 78, Pipe Line News.

*Primary Examiner*—Richard A. Farley
*Assistant Examiner*—N. Moskowitz
*Attorney, Agent, or Firm*—Edwin E. Greigg

[57] ABSTRACT

A system for systematical detecting a leak of fluid from a long pipe comprising a plurality of apparatuses like microphones set at relatively large intervals within a relatively long limited space, formed by utilizing the wall of the pipe like a space within the pipe and extending longitudinally of the pipe. The apparatuses intercept sonic waves caused by the leak of fluid from the pipe propagated in the limited space. The system further includes an apparatus for detecting that at least one first-mentioned apparatus has intercepted the sonic wave caused by the fluid leak.

16 Claims, 9 Drawing Figures

METHOD OF DETECTING LEAK OF FLUID FROM A LONG PIPELINE

This is a division of application Ser. No. 247,474, filed Apr. 25, 1972, now U.S. Pat. No. 3,814,207.

BACKGROUND OF THE INVENTION

The present invention relates to a system for detecting a leak of fluid from a long pipeline for transporting fluid such as town gas, natural gas, oil or the like.

In recent years, pipelines have been used extensively for long distance transport of fluid. The longer the pipeline, the more difficult it is to detect a leak of fluid from the pipe and generally a long period of time elapses before a fluid leak is found. Particularly in the case where the fluid transported by the pipeline is inflammable, explosive or toxic, the delay in the detection of the leak is liable to cause a serious accident. Accordingly, there is a need to provide a system for detecting a leak which is practically applicable to industries and which enables the operator from his place such as a monitoring station to promptly reliably detect any leak no matter where it may occur in a long pipeline. It is further desired to provide a system by which the operator from his place such as a monitoring station can locate the leak, namely a system capable of pinpoint detection.

Various means for detecting a leak of fluid from the pipe have heretofore been used, but none of the conventional means fulfilled the above-mentioned needs. More specifically, already known is a detecting apparatus such as an ultrasonic gas leak detector and a water leak detector which detects the leak of fluid from the pipe by utilizing an elastic wave caused by the fluid leakage. However, such apparatus fails to achieve a reliable leak detection unless the elastic wave utilized has a considerable intensity and is distinct from other elastic waves. In fact, the conventional apparatus of this type can not detect the leak if it is not within the reach of several meters, so that the apparatus has to be carried about by the operator for the detection of the leak. Thus a leak detection for a long pipeline has heretofore required much labor and time, and even at the expense of much labor, it has been practically impossible to detect the leak immediately after the occurrence of the leak.

Another apparatus has also been proposed which, like an inflammable gas detector, detects a leak of fluid by utilizing chemical and physical properties of the fluid. With the apparatus of this type, however, there is a need to intercept the leaked fluid by the apparatus per se, with the result that such apparatus is generally capable of local detection only, is less reliable in detecting leaks, takes a long period of time to detect the leak and is limited with respect to objects for which it is serviceable for detection.

SUMMARY OF THE INVENTION

The present invention provides a leak detecting system by which any leak of fluid from the pipe of a long pipeline can be detected from a remote location almost simultaneously when the fluid leak occurs and which assures detection of the leak throughout the entire length of the pipeline only with a smaller number of detecting elements relative to the length of the pipeline, the system thus being very economical in its entirety for practical application.

The present invention is fundamentally characterized in comprising forming a long hollow space being a relatively elongated space extending longitudinally along the pipeline and defined at least one side by the wall of the pipe such as a space within the pipe or a space between the pipe and a wall surrounding the pipe, intercepting sonic waves propagated through the hollow space by first means such as microphones from among sonic waves caused by a fluid leak from the pipe of a pipeline, the information of detection of the sonic waves by the first means being given to second means at a monitoring station or the like so that the operator can quickly and reliably detect the leak by the second means at a remote location no matter where the leak may occur in the long pipeline.

The present inventors have carried out extensive researches, noting that sonic waves propagated through the above-mentioned hollow space among those produced by the leak will be transmitted over a very long distance as in a speaking tube and that the hollow space will be free of other outside sonic waves and inside sonic waves indistinguishable from the sonic wave caused by the leak. As a result, it has been discovered that the sonic wave caused by the leak can be intercepted by the first means which is positioned very remote from the leak point, by intercepting the sonic wave propagated through the hollow space. Thus it has become possible to monitor a leak throughout the whole length of a pipeline by a smaller number of the first means relative to the length of the pipeline.

As already described, the intensity of background noise is much lower than that of a sonic wave caused by a leak within the hollow space, so that the leak of fluid from the pipe can be detected with extreme ease if it is possible to detect that the intensity of a sonic wave intercepted by the first means is in excess of a predetermined value. This value is determined in consideration of the frequency characteristics and intensity characteristics of the sonic wave caused by a leak and a background noise. The detection of intensity of the sonic wave exceeding the predetermined value may be conducted by the first means, the second means or some other means. Detection by the first means will assure convenience of communication to the second means, while in the case of the latter the sonic wave caught by the first means is converted to a wave signal such as an electric current, an electric wave or a pulse signal, which is then sent to the second means.

In the case where a sonic wave caused by a leak is masked by a background noise because the leak is infinitesimal or the first means are set apart by too great a distance, a method or apparatus may be employed wherein the sonic wave intercepted by the first means is subjected to self-correlation analysis by a self-correlator, preferably real time correlator, to selectively take out the sonic wave caused by the leak from the sonic wave intercepted by the first means. Alternatively, adjacent two first means may be set in such arrangement that the two first means can respectively intercept a sonic wave caused by a leak which occurred between the two first means. Thus at least two first means intercept a sonic wave propagated through the hollow space. At least two sonic waves thus intercepted by the plurality of first means respectively are then subjected to cross-correlation analysis by a crosscorrelator, preferably a real time correlator, to thereby select a sonic wave caused by the leak from among the sonic waves intercepted by the first means. The selection of the sonic wave from among the sonic waves intercepted by the first means is conducted by a self or cross correlator through improvement of S/N ratio according to smoothing method or averaging method. In other words, the sonic wave caused by a leak is taken out by lowering the intensity level of the background noise. It is preferable to conduct the above-mentioned self-correlation analysis prior to the detection of intensity of the sonic wave which is in excess of the predetermined value, since the leak detection will then be achieved free of errors. Accurate detection of a leak of fluid can also be made by taking out, in the form of a pattern, changes with lapse of time in the frequency and intensity of a sonic wave intercepted by the first means and comparing the pattern with a standard pattern showing changes with lapse of time in the frequency and intensity of a sonic wave when a leak of fluid from the pipe is present. Such pattern may be obtained, for example, by utilizing sound spectrograph. For instance, the intensity is indicated with varying density on a graph, with time plotted as abscissa vs. frequency as ordinate.

Since the information that the first means has intercepted the sonic wave caused by a leak is sent to the second means, which then the monitor detects the presence of the leak, the monitor can detect any leak in a long pipeline from his place, with the result that a continuous leak monitoring operation for a long pipeline can be easily conducted by a few persons or by one person. Because the leak can be detected by utilizing the sonic wave resulting from a leak as described above, the leak can be detected almost simultaneously with the occurrence thereof.

Another feature of this invention is that the interior space of the pipe is found serviceable as the hollow space as already described, which renders the leak monitoring system more economical in construction and readily applicable to practical use. More specifically, whereas it was generally considered that the sonic wave produced by the leak is released outside with greater intensity than toward the interior of the pipe, the present inventors have unexpectedly found that the incidence into the interior of pipe of the sonic wave caused by the leak is only slightly weaker than that released outward from the pipe. Based upon this finding, the very economical leak monitoring system described above has been completed.

The present invention is further characterized in that not only the presence of a leak can be detected, but the position of the leak can be pinpointed throughout a long pipeline with a smaller number of the first means relative to the length of the pipeline by the monitor from his place.

Thus, sonic waves caused by a leak are intercepted by a plurality of the first means which sonic waves are converted to wasve signals respectively. The wave signals are then fed to third means for indicating the relative relation between the wave signals. Based upon the signal supplied to the third means, the relative relation between the sonic waves intercepted by the first means is analyzed to pinpoint the leak.

More specifically, by utilizing the fact that the intensity of the sonic waves caused by a leak attenuates in relation with the distance of propagation through the hollow space, the ratio between the intensities of the sonic waves intercepted by a plurality of the first means is determined and a leak point can be pinpointed from the intensity ratio using the positions of the pertinent first means as a parameter. Further by utilizing the fact that the time required for the sonic wave caused by a leak to reach the first means varies in proportion to the distance from the leak point to the first means, it is possible to pinpoint the leak point from the difference in the time required for the sonic wave caused by a leak to reach each of a plurality of first means, using the positions of the first means as a parameter.

For pinpoint detection of a leak from the intensity ratio, each of the wave signals may be subjected to the self correlation analysis prior to the comparison of intensity, to selectively take out a wave signal resulting from a leak among the wave signals, whereby pinpoint detection can be achieved even when sonic wave caused by a leak is masked by a background noise. To pinpoint the leak based on the difference in time required for the sonic wave caused by the leak to be propagated from the leak point to the respective first means, the time difference can be determined by subjecting to crosscorrelation the plurality of sonic waves intercepted by the first means respectively. In this case, the pinpoint detection can be achieved even when a sonic wave caused by a leak is masked by a background noise through improvement of S/N ratio according to averaging method.

An object of this invention is to provide a system which enables the monitor from his place to quickly and reliably detect the presence of a leak of fluid from the pipe of a long pipeline by intercepting sonic waves caused by the leak.

Another object of this invention is to provide a system which enables the monitor from his place to pinpoint the position of a leak from the pipe of a long pipeline by utilizing sonic waves produced by the leak.

Another object of this invention is to provide a system which is capable of detecting a leak from the pipe of a long pipeline and pinpointing the same economically with respect to construction and labor and which is therefore readily applicable to practical use.

Still another object of this invention is to provide a system facilitating a continuous monitoring operation for a leak in a long pipeline.

DESCRIPTION OF THE PREFERRED EMBODIMENT

Figure 1:
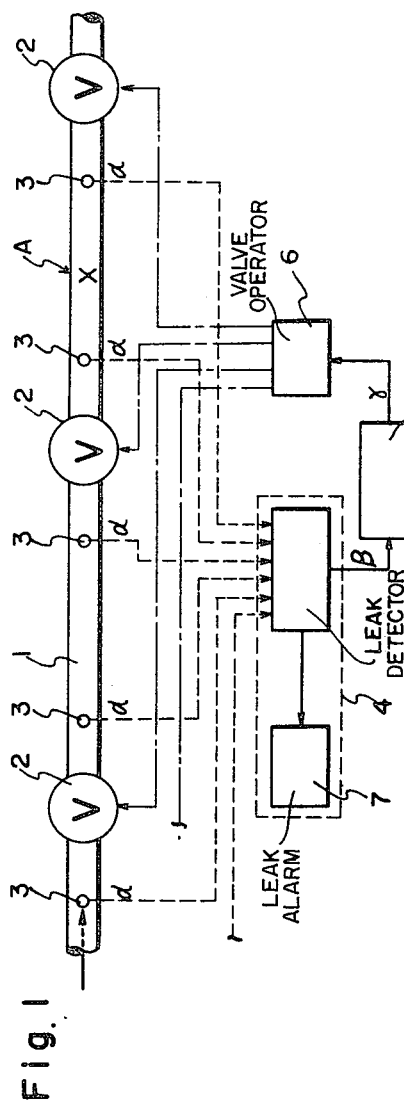
FIGS. 1 and 2 are schematic diagrams for illustrating a system for detecting the presence of a fluid leak from a pipe.

FIG. 1 shows a pipe 1 for transporting fluid, valves 2 for closing the pipe 1, first means 3 for intercepting sonic waves propagated in the pipe 1 from among those produced by a leak of fluid from the pipe 1, second means 4 for receiving a signal $\alpha$ from the first means 3 for notifying that the first means 3 has intercepted the sonic wave caused by the leak, a control unit 5 for giving a signal $\gamma$ for shutting a suitable valve 2 to a valve closing unit 6 in response to a signal $\beta$ from the second means 4, and an alarm unit 7 included in the second means 4 for indicating the leak.

Suppose a fluid leak from the pipe 1 at point A, a sonic wave caused by the leak is intercepted by at least one first means 3 which is nearest to the leak point A, upon which the first means 3 gives a signal α to the second means 4, whose alarm unit 7 indicates the presence of the leak. At the same time, the second means 4 emits a signal β to the control unit 5, causing the valve closing unit 6 to close a suitable valve 2 to stop the flow of the fluid to the leak point A.

A plurality of the first means 3 are set substantially within the pipe 1 and spaced apart by a suitable distance so as to intercept a sonic wave propagated through the pipe 1 from among those produced by the leak. Adjacent two first means 3 are spaced apart by such distance that at least one of the first means 3 is capable of intercepting the sonic wave caused by a leak occurred at any point A at least between the two first means 3. Thus wherever a leak may take place in the long pipeline, the monitor from his place such as monitoring station can detect the leak by the alarm unit 7. Moreover, since the sonic wave is utilized, the alarm unit 7 operates almost simultaneously with occurrence of the leak to indicate the same.

Figure 2:
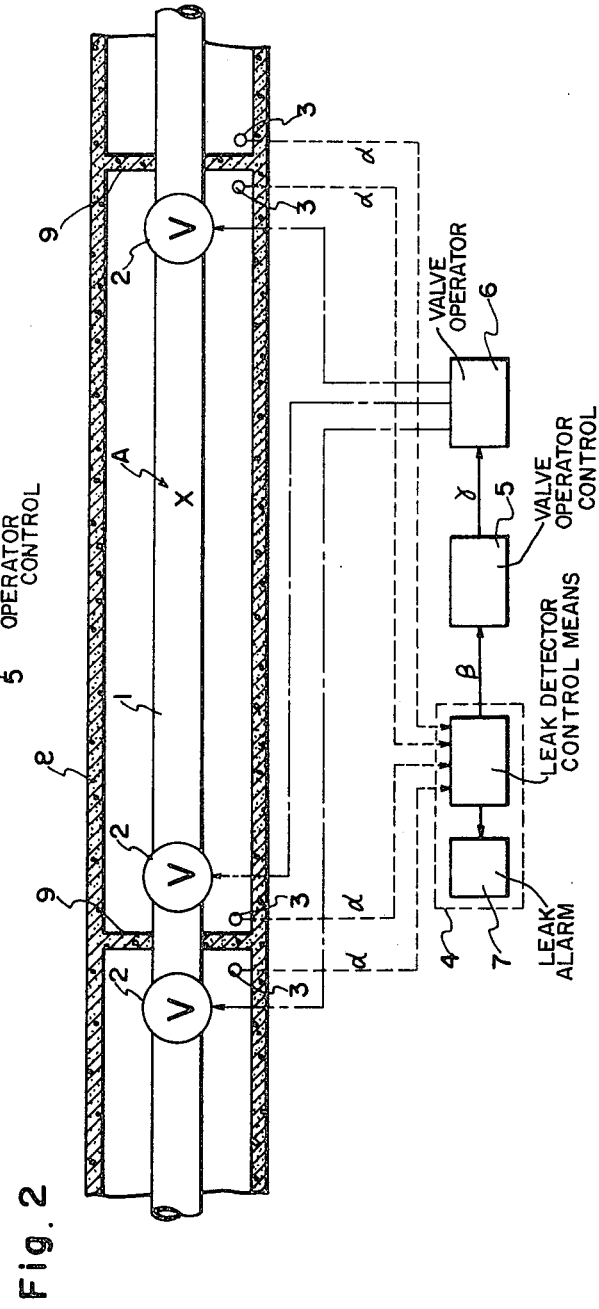

As shown in FIG. 2, the first means 3 may be set at such position as to intercept the sonic wave caused by a leak which is propagated through a hollow space formed between the pipe 1 and a wall 8 surrounding the pipe 1, the arrangement being such that the first means 3 is capable of intercepting the sonic wave propagated through a relatively long hollow space extending longitudinally along the pipe 1 and defined at least one side thereof by the wall of the pipe 1. Indicated at 9 in FIG. 2 are partition walls.

According to experiments conducted by the present inventors, it has been found that the adjacent first means 3 may be spaced apart by as long a distance as several kilometers. The results of the inventors' researches are given below.

Figure 3:
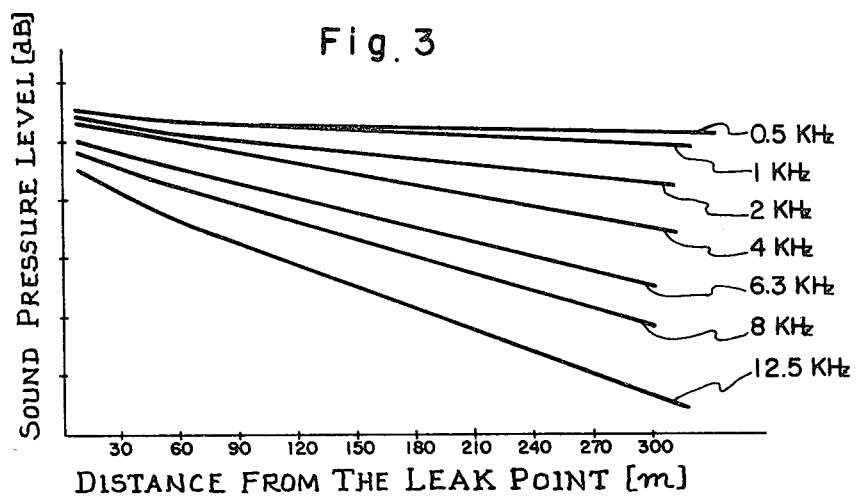
FIGS. 3 to 6 are graphs showing the results of experiments.

FIG. 3 shows the attenuation of intensity of the sonic wave produced by a leak and propagated within the pipe 1 as determined by experiment. It is seen that the sonic wave was propagated over a very long distance relative to the inner diameter of the pipe 1.

Figure 4:
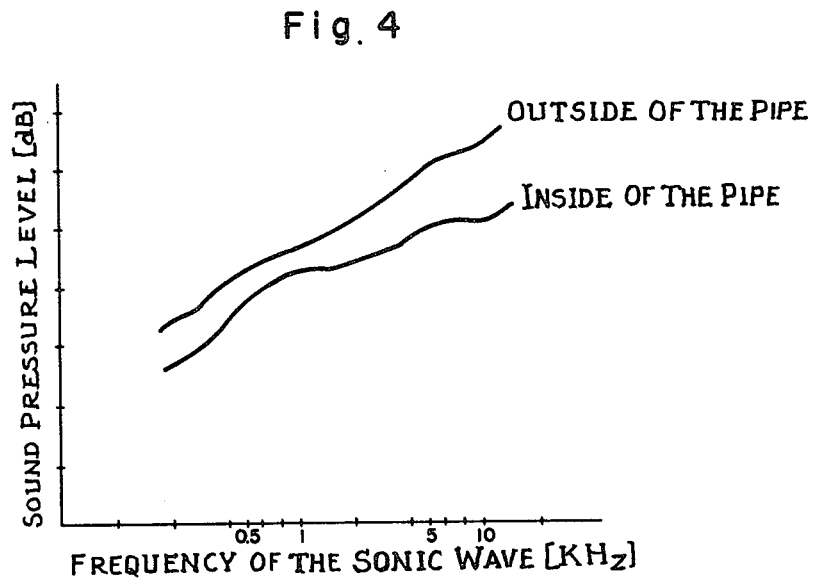

Further FIG. 4 shows the difference, between the inside and outside of the pipe 1, in the intensity of the sonic wave caused by a fluid leak from the pipe 1 as determined by actual experiment. The results indicate that the sonic wave propagated within the pipe 1 is only slightly weaker than that emitted outward from the pipe 1. From the foregoing results, it will be understood that by utilizing the sonic wave propagated within the pipe 1, the adjacent first means 3 can be spaced apart by a very long distance and the sonic wave caused by a leak can be intercepted with high reliability.

Figure 5:
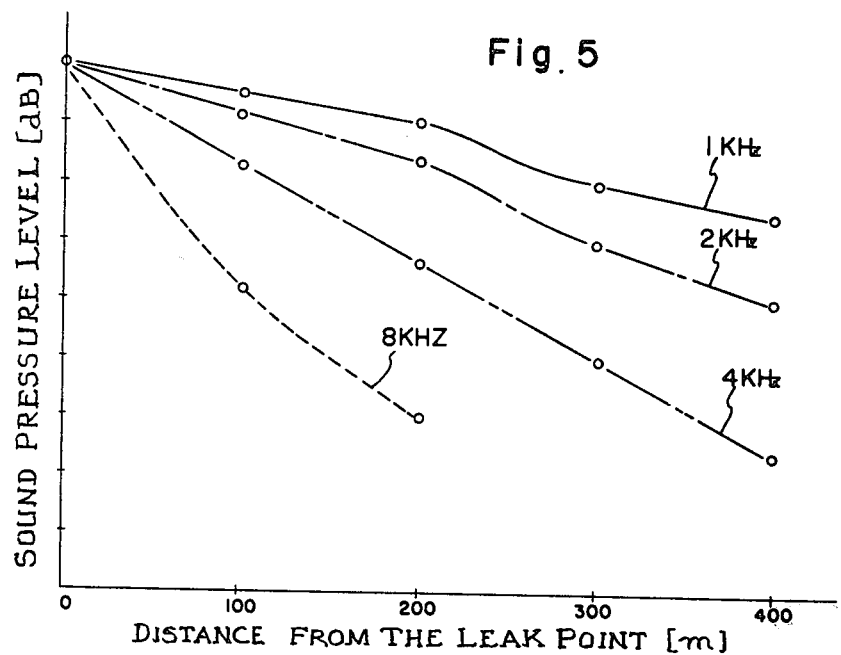

FIG. 5 shows the attenuation of intensity of the sonic wave propagated through the hollow space as shown in FIG. 2 defined by the pipe 1 and the wall 8 surrounding the pipe 1 as determined by actual measurement. The results also indicate that the sonic wave was propagated over a very long distance.

Figure 6:
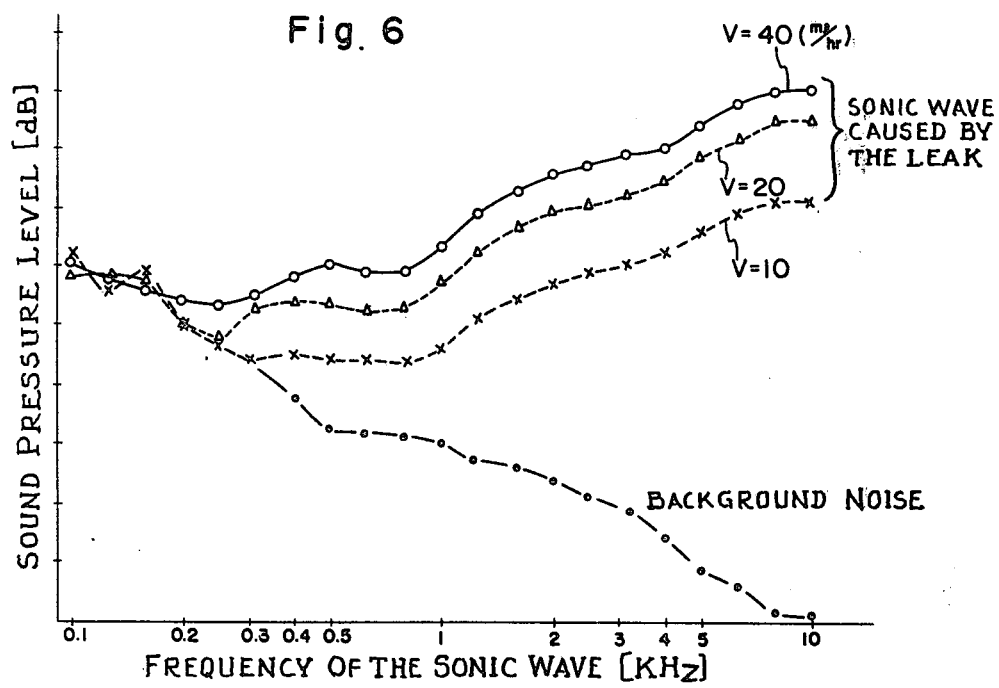

FIG. 6 shows the results of actual measurement for the comparison of intensity of sonic wave caused by a leak in the hollow space defined by the pipe 1 and the wall 8 surrounding the pipe 1 as seen in FIG. 2 and the intensity of a different sonic wave. The sonic wave caused by the leak was readily distinguishable from a background noise. In the figure, $\overline{V}$ indicates the amount of leak fluid.

The first means 3 may specifically be a microphone or strain gauge. As the first means 3, it is most preferable to use means which intercepts the sonic wave caused by the leak and having a suitable frequency band with a desired sensitivity, depending upon the actual state of elastic waves other than the sonic wave caused by the leak within the hollow space, the distance between the first means 3, intensity characteristics of the sonic wave caused by the leak to be intercepted, propagation characteristics of the sonic wave caused by the leak and etc.

The signal α given by the first means 3 to the second means 4 includes an electrical wave signal converted from the sonic wave caused by a leak and intercepted by the first means 3, and a signal such as a direct current for merely notifying the fact that the first means 3 has intercepted the sonic wave caused by the leak.

A greater saving in labor is ensured by installing at one place a plurality of second means 4 for a plurality of the first means 3 respectively.

A system for pinpointing the position of the leak point A will be described.

Figure 7:
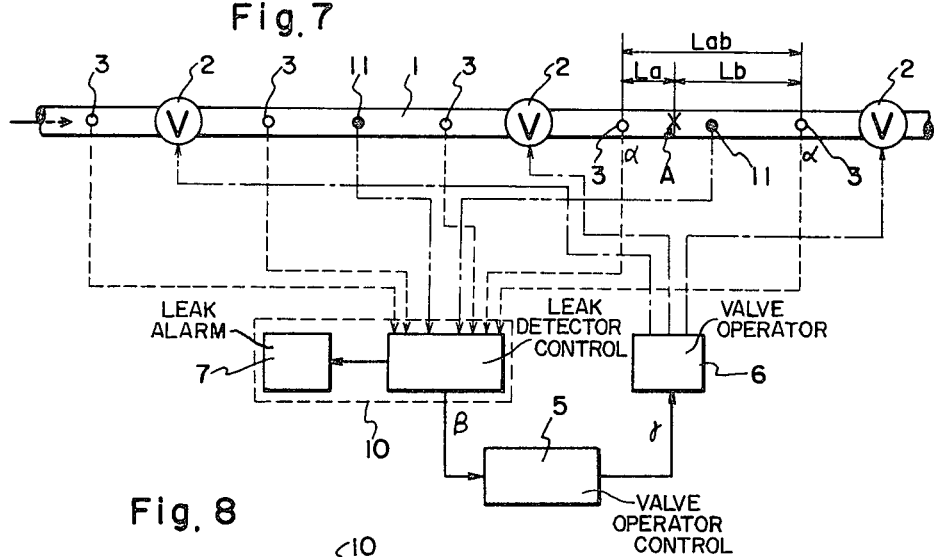
FIG. 7 is a schematic diagram illustrating a system for pinpointing the position of a fluid leak from a pipe.

FIG. 7 shows third means 10 for receiving at least two signals α from first means 3 to indicate the relative relation between the signals α and including alarm means 7 for indicating the presence of a leak, the third means 10 including the function of the second means 4 and adapted to give an instruction signal β to the control unit 5; and a measuring unit 11 for measuring the velocity of the fluid within the hollow space and informing the third means 10 of the measured value.

In the system shown in FIG. 7, the signal is a wave signal converted from the sonic wave intercepted by the first means 3 and is obtained for example by a combination of microphone and amplifier. The adjacent first means 3 are spaced apart by such a distance that the sonic wave caused by the leak within the coverage of both first means 3 can be intercepted by both first means 3 and are so constructed as to perform such function.

Put in detail, suppose a fluid leak from the pipe 1 at a point A, at least two first means 3 on the opposite sides of the leak point A intercept the sonic waves caused by the leak, whereupon the first means 3 feed signals α to the third means 10, which indicates the relative relation between the signals α. At the same time the alarm unit 7 gives an alarm giving notice to the occurrence of the leak. Further a suitable valve 2 is automatically closed to stop the supply of fluid to the leak point A. The relative relation between the wave signals α is analyzed to pinpoint the position of the leak point A. The analysis may be conducted manually, but a greater convenience will be assured by incorporating a computing unit and an indicating unit in the third means 10 so as to give the indication of the leak point A.

Two types of means for detecting the position of the leak and the principle thereof will now be described which employ the third means 10 including the computing unit and the indicating unit.

EXAMPLE 1

Figure 8:
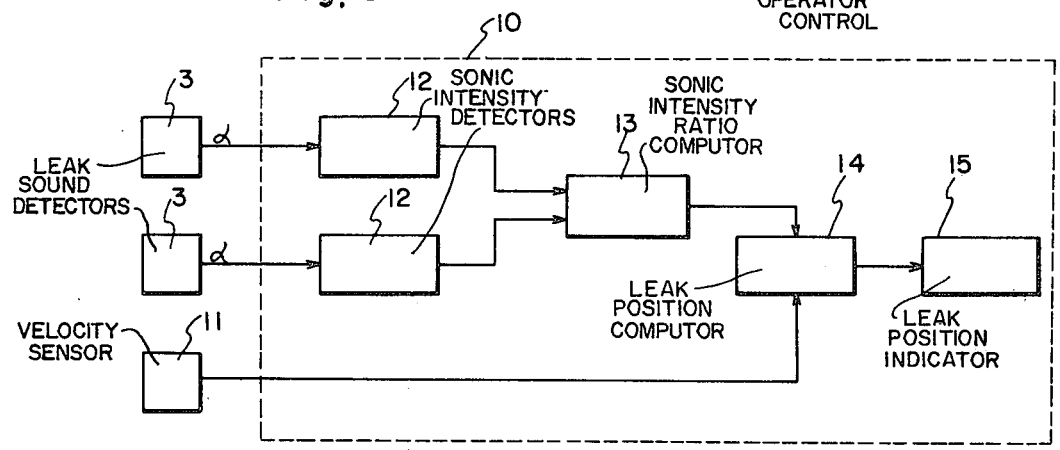
FIGS. 8 and 9 are block diagrams showing the construction of the foregoing third means.

As shown in FIG. 8, the third means 10 comprises units 12 for detecting the intensity levels of the signals α from the first means 3 respectively, a unit 13 for computing the ratio of intensity level between two sonic waves caused by a leak and intercepted by the first means 3 based upon the signals from the units 12, a unit 14 for computing the position of leak point A from the ratio of intensity level given by the unit 13, using the positions of the first means 3 as a parameter which means have intercepted the sonic waves caused by the leak, and a unit 15 for indicating the value determined by the unit 14.

Assuming that the distances between the leak point A and the first means 3 on the opposite sides thereof are $la$ and $lb$ respectively as shown in FIG. 7, the position of the leak point A can be given by $$la = \frac{1}{2}\left(1 - \frac{v}{V}\right) lab - \frac{1}{2\alpha} \log la/lb \qquad (1)$$

wherein:
- $V$ is the propagation velocity of the sonic wave caused by a leak in the air when the velocity of air stream is zero, the propagation velocity being memorized by the unit 14,
- $v$ is the velocity of fluid within the hollow space when a leak occurs, which is given by the measuring unit 11 to the unit 14,
- $ab$ is the distance between adjacent two of the first means 3 to be memorized by the unit 14,
- $\alpha$ is a coefficient of intensity attenuation of the sonic wave caused by a leak as it is propagated within the hollow space, the coefficient $\alpha$ being memorized by the unit 14, and
- $Ia$ and $Ib$ are the intensities of sonic waves caused by a leak and intercepted by the first means 3 respectively and are given to the unit 13 by the signals from the first means 3, $Ia/Ib$ being computed by the unit 13, which gives the resulting value to the unit 14.

Thus, if the distance between the leak point A and the first means 3 at the upstream side with respect to the fluid flow within the limited space is $la$, effective distances $La$ and $Lb$ over which the sonic wave caused by the leak are to be propagated from the leak point A to the first means 3 respectively will be, in consideration of $V$ and $v$, $$La = \frac{V + v}{V} la \qquad (2)$$

$$Lb = \frac{V - v}{V} lb \qquad (3)$$

Further the intensity of the sonic wave caused by the leak at point A as it is released into the hollow space is $Io$, $$Ia = Io\, e^{-\alpha \cdot La} \qquad (4)$$
$$Ib = Io\, e^{-\alpha Lb} \qquad (5)$$

Equations (4) and (5) give $$Ia/Ib = e^{-\alpha(La - Lb)} \qquad (6)$$

From equations (2), (3) and (6), Equation (1) will be obtained.

Preferably, the third means may comprise a selfcorrelator and a signal derived from a sonic wave caused by a leak and taken out from among the sonic waves intercepted is fed to the unit 13. To improve the accuracy of pinpoint detection of the leak point A by the third means 10, the first means 3 may preferably be such as is highly sensitive to a sonic wave having a frequency which will undergo suitable attenuation, in view of the relation between the frequency and the propagation attenuation of the sonic wave caused by the leak shown in FIGS. 3 and 5, and use the unit 12 for detecting the intensity level of the signal from the first means 3, which is capable of selectively detecting a sonic wave having the highest possible frequency band.

Further since the coefficient of attenuation of the sonic wave caused by the leak varies in accordance with the frequency band selected, it is desired from the viewpoint of accuracy that the width of the frequency band be as small as possible. Conveniently, the results obtained from the respective frequency bands may be judged from an overall viewpoint, whereby the position of the leak point A can be pinpointed with greater accuracy.

If the value to be given as the propagation velocity $V$ of the sonic wave caused by the leak is varied in accordance with the temperature and pressure within the hollow space, more accurate pinpoint detection of the leak point A will be achieved, hence convenient.

The measuring unit 11 may be omitted, in which case an estimated value will be memorized in said unit 14 as the value $v$. Even if the estimated value should include a small error, the resulting difference between the position of the leak point detected and the actual position of the leak will be substantially slight, inasmuch as $v$ is generally very small as compared with $V$.

EXAMPLE 2

Figure 9:
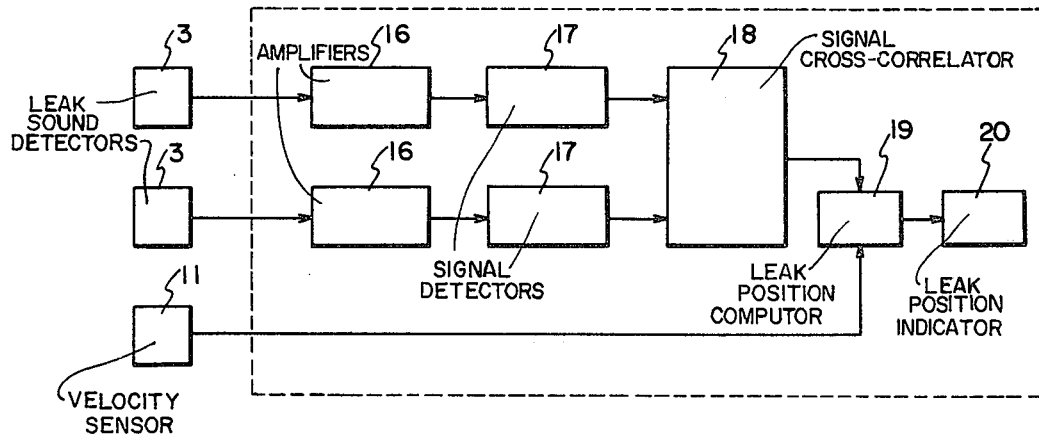

As shown in FIG. 9, the third means 10 in this example comprises amplifiers 16 for amplifying a signal from the first means 3 respectively, units 17 for selecting and detecting a signal of required frequency band from among those from the amplifiers 16 respectively, a cross-correlator 18 for analyzing the cross-correlation between the signals from the two units 17 for determining the difference between the times required for the sonic wave caused by a leak to be propagated from the leak point A to the respective first means 3, a unit 19 for computing the position of the leak point A based on the information from the cross-correlator 18 and a unit 20 for indicating the value computed by the unit 19.

Supposing, as shown in FIG. 7, that $la$ is the distance between the leak point A and the first means 3 at the upstream side relative to the flow of fluid in the hollow space, $lb$ is the distance between the leak point A and the first means 3 at the downstream side of said fluid and $lab$ is the distance between both first means 3, the position of the leak point A is determined by $$la = \frac{V-v}{2V}[(V + v)\Delta\, tab + lab] \qquad (7)$$

wherein:
$V$ and $v$ are propagation velocity of the sonic wave and the velocity of fluid in the hollow space as described in Example 1 respectively, and $\Delta$ tab is the difference between the times required for the sonic waves caused by the leak to be propagated from the leak point A to the respective first means 3, which is determined by the cross-correlator 18.

Thus, if $ta$ and $tb$ are the times required for the sonic waves caused by the leak to be propagated from the leak point A to the respective first means 3, $$ta = \frac{la}{V - v} \qquad (8)$$

$$tb = \frac{lb}{V + v} \qquad (9)$$

Equations (8) and (9) give $$\Delta tab = ta - tb = \frac{la}{V - v} - \frac{lb}{V + v} \qquad (10)$$

Further
$$la = lab - lb \qquad (11)$$

From equations (10) and (11)

$$\Delta tab = \frac{la}{V - v} - \frac{lab - la}{V + v} \qquad (12)$$

By simplifying this equation, Equation (7) is obtained.

In Example 2, the Δ tab is obtained by utilizing the distribution pattern of frequency of the sonic waves caused by the leak or a variation in intensity of the sonic wave with the lapse of time. Accordingly, the frequency band to be selected by the unit 17 which detects a signal of the required frequency band may preferably be such that the propagation attenuation is low, in view of the relation between the frequency of the sonic wave caused by the leak and propagation attenuation thereof as shown in FIGS. 3 and 5. Further in consideration of the intensity characteristics and frequency characteristics of the sonic wave caused by the leak as shown in FIGS. 4 and 6, the width of the frequency band to be selected may preferably be great or small depending on the case.

The leak monitoring system of this invention may be also applicable to monitoring operation for a leak of fluid from a fluid storage tank such as a high pressure gas tank, crude oil tank etc. More specifically, the presence of a fluid leak from the tank can be detected by positioning a suitable number of the first means 3 substantially within the interior space of the tank so that at least one of the first means 3 will intercept the sonic wave propagated through the space from among those produced by a leak, no matter where the leak may occur in the tank. Further the position of a leak point can be pinpointed, wherever it may occur in the tank, by causing at least three first means 3 disposed out of alignment to intercept sonic waves caused by a leak, analyzing the relative relation between the three sonic waves caused by the leak as in the foregoing Examples 1 and 2 and determining the position from the results of analysis using the position of each first means as a parameter.

What we claim is:

1. A method of detecting a leak of fluid from a pipe of a long pipeline for transporting fluid comprising, in combination:
    a. forming a long hollow space defined at least on its one side in cross section by a wall of said pipe for the transport of fluid, said hollow space extending longitudinally along said pipe;
    b. providing a plurality of stationary first means for intercepting sonic walve propagated within said hollow space, individual ones of said first means being in longitudinally spaced apart relationship to each other along said pipe over a long distance, any two of said individual ones of said first means which are adjacent to one another being capable of separate interception of a sonic wave inside of said pipe caused by a leak which may occur between them;
    c. providing second means for detecting signals from said plurality of first means indicating the interception of a sonic wave by said first means;
    d. causing at least any two of said first means which are adjacent to one another to intercept a sonic wave propagated within said hollow space;
    e. causing said second means to detect the signals from said plurality of first means indicating that a sonic wave caused by a leak has been intercepted by at least said two adjacent ones of said first means; and
    f. analyzing the relative relation between the signals; whereby the presence and position of a fluid leak from the pipe is detected.

2. A method as set forth in claim 1, including providing a plurality of said second means, corresponding on a one-to-one basis to said first means, and positioning all of said second means at one place.

3. A method as set forth in claim 2, wherein the step of forming said hollow space is the step of forming this space from interior space of said pipe.

4. A method as set forth in claim 2, wherein the step of forming said hollow space is the step of forming this space from space formed between said pipe and a wall surrounding said pipe.

5. A method as set forth in claim 2, including determining when intensity of a sonic wave intercepted by at least one of said first means exceeds a predetermined value as an indication of a leak.

6. A method as set forth in claim 5, wherein the determining step is effected by at least one of said first means which detect that the intensity of an intercepted sonic wave has exceeded the predetermined value.

7. A method as set forth in claim 5, including sending from said first means to said second means a wave signal converted from a sonic wave intercepted by said first means, and determining with said second means that the intensity of the wave signal has exceeded a predetermined value thus indicating that the intensity of the sonic wave has exceeded the predetermined value.

8. A method as set forth in claim 2, including selecting a sonic wave caused by a leak of fluid from said pipe by self-correlation analysis from among sonic waves intercepted by said first means, thus determining presence of the leak.

9. A method as set forth in claim 2, including intercepting by at least two of said first means a sonic wave propagated through said hollow space, subjecting a plurality of sonic waves intercepted by a plurality of said first means respectively to cross-correlation analysis. selecting a sonic wave caused by a leak by cross-correlation analysis from among the sonic waves thus intercepted, thus determining the presence of a leak.

10. A method as set forth in claim 1, including forming a pattern from frequency and intensity changes in the sonic wave intercepted by said first means during a time period, and comparing the pattern thus obtained with a standard pattern showing known changes over a period of time in frequency and intensity of a sonic wave upon the occurence of a leak of fluid from said pipe, thus determining the presence of a leak of fluid from said pipe.

11. A method as set forth in claim 2, further comprising causing at least a number of said plurality of said first means to produce a plurality of respective signals indicating that said first means have intercepted the sonic wave; providing third means which include said second means at one place; sending the signals produced by said first means to said third means, these signals being a plurality of wave signals converted from the sonic waves intercepted by each one of said first means; and analyzing the relative relation between the wave signals sent to said third means so as to pinpoint the position of a leak point.

12. A method as set forth in claim 11, wherein the analyzing step is effected by comparison of relative intensity among a plurality of the wave signals produced by at least a number of said plurality of said first means.

13. A method as set forth in claim 12, including subjecting each of the wave signals to self-correlation analysis prior to the comparison step to select from among the wave signals a wave signal caused by a leak.

14. A method as set forth in claim 11, wherein the step of analyzing is effected by determining difference between times required for the sonic waves to be propagated respectively from the leak point to at least a number of said plurality of said first means respectively by a crosscorrelation analysis among the wave signals.

15. A method as set forth in claim 11, wherein the analyzing step includes automatically analyzing the relative relation among said signals; and further comprising automatically computing the position of the leak point based on the analysis of the relative relation, and indicating the resulting value.

16. A method as set forth in claim 15, further comprising automatically stopping supply of the fluid to the leak point by closing means.

* * * * *